Patented June 19, 1951

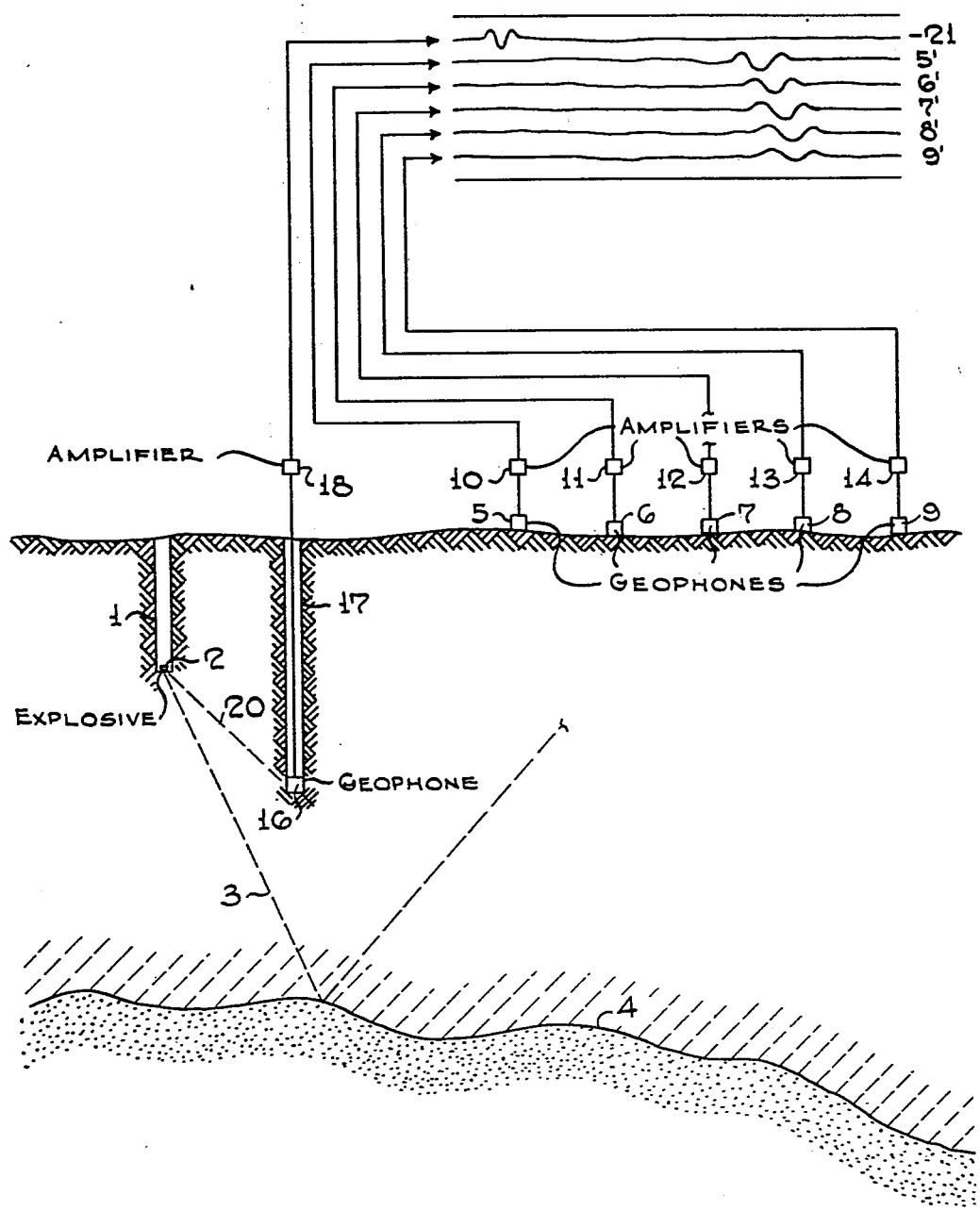

2,557,714

UNITED STATES PATENT OFFICE 2,557,714

SHOT PULSE RECORDING IN REFLECTION SEISMOGRAPHY

Philip S. Williams, Tulsa, Okla., assignor to Standard Oil Development Company, a corporation of Delaware Application September 13, 1947, Serial No. 773,750

2 Claims. (Cl. 181—.5)

The present invention is directed to that branch of geophysical exploration known as reflection seismography in which reflections of seismic waves are studied to determine the depth of reflecting substrata.

Reflection seismography is typically carried out by setting off a charge of explosives at a set point known as the "shot-point" and picking up the waves emanating from the explosion after they have been reflected by substrata. Geophones or seismopickups used to receive the reflected seismic waves, are arrayed in any desired fashion, generally in line with the shot-point and spaced from the shot-point and from each other. These geophones are devices which are provided with means for converting the mechanical vibrations imparted by seismic waves into electrical impulses. Each geophone is connected to a suitable electrical amplifying circuit, the output of which is connected to a moving coil galvanometer with a mirror attached to the coil. Conventionally these galvanometers are arranged in a battery relative to a light source and a moving strip of sensitized paper so that a plurality of wave forms or traces will be recorded on the paper; each trace corresponding to the seismic wave received by a particular geophone. The strip of recording paper is moved longitudinally at a substantially constant speed and is provided with transverse time marks so as to make possible the indication of the instant of the shot and the determination of the time of arrival of any particular point on the traces, after the firing of the shot.

The use of records so produced to give information as to the subsurface structure of the earth is based on the principle that part of the energy of the seismic disturbance caused by the explosion will travel downwardly into the earth and be reflected back to the surface by various more or less well defined strata existing below the surface and that the arrival of reflected energy at the surface will be detectable on the record. By reading the arrival time of such a disturbance on the record, the depth of the reflecting stratum can be computed, using data otherwise obtained as to the velocity of the seismic waves in the substrata.

The detection of reflected waves on the record is very often extremely difficult. This is largely due to the fact that the traces generally show rather continuous random disturbances resulting from energy coming to the geophones directly or by refraction from the shot or created by outside disturbances such as moving objects in the vicinity or the wind. The reception of weak and multiple reflections is a further complication. The interpretation of the record displaying the reflected waves is also more difficult in view of the fact that conventionally the records of six or more geophones are recorded on a single strip of recording paper causing some overlapping and confusion of the individual traces. Consequently, a certain amount of experience and skill is required to accurately determine a reflection as distinguished from random disturbances. Identification of the reflection depends on two principles. The first is the direction finding properties of the seismopickup arrangement. The identification of a disturbance as a reflection may be made since a reflection will appear on each of the traces in such a time sequence as to indicate they were coming from some point below rather than horizontally from the shot point. The second principle is that a reflection will show some increase in the amplitude of the motion indicated by the trace. These two characteristics of a reflection, that is, a particular sequence in the lining up of the disturbances of the traces and an increase in the general amplitude of the traces are fundamentally connected in that a reflection, to show through the random disturbances, must signal the arrival of additional vibratory energy from the subsurface.

A wide variety of proposals have been made to simplify the interpretation of such a record to identify reflections. The present invention is based on the discovery that the interpretation of a record of the aforesaid type can be facilitated by including in it in addition to the customary traces, a trace representing the wave form of the down traveling seismic pulse produced by the explosives. By comparing the shape of the disturbances reflected from substrata to the shape of the down traveling seismic pulse, the identification of reflections may be more readily made. This depends on the fact that the characteristics of the seismic waves generated by the shot depends considerably on the nature of the earth formation in which the shot is fired. For example, the seismic disturbance created in loose sand differs materially from that created in a limestone formation. Therefore it is valuable in the interpretation of a record to include a trace showing the characteristics of the seismic waves generated by the shot in the particular formation where it is detonated. In accordance with this invention, a geophone is placed in the bottom of a drilled hole adjacent to the shot hole for reception of seismic energy directly from the shot. The output of this geophone is then impressed on an amplifier having the same characteristics as the amplifiers of the other geophone pickups and is then reproduced on the recording paper as an additional trace.

The nature and objects of the present invention will be better understood from the following detailed description in connection with the accompanying drawing in which an embodiment of the present invention is diagrammatically shown.

Referring to the drawing, a shot hole 1 is shown at the bottom of which is a dynamite charge 2 which is fired to set up the seismic disturbances to be measured. Preferably the shot hole 1 is deep enough to position the dynamite charge below the weathered layer of the earth. As is well known, this weathered layer consists primarily of unconsolidated material causing unsatisfactory initiation of seismic waves if the shot is fired therein. For this reason the dynamite charge is preferably positioned in a shot hole deep enough so that the dynamite is substantially below the weathered layer. Nevertheless it is entirely within the scope of this invention that, if desired for any reason, the explosive charge may be detonated in the weathered layer or even on the surface of the earth. Seismic waves generated by the explosion travel in all directions; a part of the energy following the path 3 as shown, is reflected by a substratum 4 toward the geophones 5, 6, 7, 8 and 9. The seismic energy directed downward from the shotpoint toward substratum 4 will be referred to as a "direct seismic pulse," while the seismic energy reflected upward from the substratum 4 will be referred to as a "reflected seismic pulse." The geophones 5–9 are shown at spaced intervals, aligned on the surface of the earth in intimate contact therewith. In accordance with the present invention, the number of the geophones and the position and arrangement of these geophones is not critical. Thus if desired, the geophones may be positioned below the ground and may have any desired arrangement. For example, the present invention will be equally useful in a case where the geophones are vertically spaced in a drill hole. For the sake of clarity in this description, the geophones 5–9, primarily intended to record reflected seismic pulses, will be referred to as "reflected pulse geophones." The outputs of the reflected pulse geophones are amplified by the amplifiers 10, 11, 12, 13 and 14, and by conventional means not shown in the drawing, are caused to create the traces 5', 6', 7', 8' and 9' on the record paper 15. These traces as represented on the record paper have been simplified to show the general type of disturbance which characterizes a reflected seismic wave. Each of the amplifiers shown has substantially the same amplification characteristics. According to the present invention, an additional geophone 16 is positioned at the bottom of a drill hole 17 adjacent to the shot hole 1. The geophone 16 which is primarily intended to record direct seismic pulses will be referred to as a "direct pulse geophone" as distinguished from the "reflected pulse geophones," 5–9. It is necessary that the geophone 16 be in intimate contact with the adjacent wall of the hole in which it is placed which may be accomplished by filling the hole with very viscous mud or by other means known to the art. The direct pulse geophone is of the same type and construction as the aforementioned reflected pulse geophones. Likewise the amplifier 18, which amplifies the output of geophone 16, has the same characteristics as the amplifiers associated with each of the other geophones. Consequently, as heretofore described, since all the geophones are of the same construction and since all of the amplifiers have the same characteristics, on receipt of a similar signal, substantially identical traces will be produced by each geophone. The drilled hole 17 containing the direct pulse geophone should be considerably deeper than the shot hole 1 and preferably is as close to the shot hole as circumstances will permit. Since the geophone 16 is thus positioned below the shot it is in the path of the direct seismic pulses traveling from the shot 2 to the reflector 4. Therefore, the trace 21 produced on the record paper by geophone 16 is a representation of the waves of seismic energy sent out by the dynamite charge to be reflected from substrata. It is thus apparent that the appearance of the direct seismic pulse as represented by trace 21 will be indicative of the appearance of the reflected seismic pulse to be expected from substratum 4. By comparing the trace of the direct seismic pulse of the direct pulse geophone with the traces of the disturbances recorded by the reflected pulse geophones, the task of identifying reflections from the substrata is considerably simplified. The invention will be particularly advantageous in cases where the wave form produced by an explosion in a particular locality differs materially from that produced in other localities, due to the change of shot characteristics from location to location.

It is known that transmission of a seismic wave through the earth is characterized by the selective absorption of the higher frequency components of the wave. Consequently, it is to be expected that the reflected seismic pulses picked up by the geophones 5 to 9 will have a different characteristic shape than that of the direct seismic pulse picked up by the geophone 16 due to the difference in the length of the travel paths of the seismic waves. It is therefore preferred in practicing this invention to alter the amplification of amplifier 18 so that the higher frequencies are attenuated in a manner similar to the attenuation caused by travel through the earth. By this means it is possible to correct the direct seismic pulse recorded by trace 21 to more nearly correspond to the actual reflected seismic pulses picked up by the reflected pulse geophones.

If it be assumed the amplitude versus frequency response of the reflected seismic pulse amplifiers 10—14 is linear, a suitable amplitude versus frequency response for the direct seismic pulse amplifier 18 would be of the form:

$$e^{-\left(\frac{f}{f_0}\right)^2}$$

where $e$ is the base of natural logarithms, $f$ is the frequency of any given wave, and $f_0$ is a reference frequency having a value corresponding to the reflection frequency dependent on the depth of the reflecting substratum and the absorptive or damping properties of the subsurface. The derivation and evaluation of this factor is given in U. S. Patent No. 2,351,456, issued June 13, 1944, to Norman H. Ricker.

In the event the amplification of the reflected seismic pulse amplifiers is not linear, the amplification of the direct seismic pulse amplifier should differ by the above function. In actual practice it may be convenient to use a direct pulse amplifier 18 having the same amplification characteristics as the reflected pulse amplifier. A suitable filter or an auxiliary amplifier may then be coupled with the amplifier 18 so that the amplification of the direct seismic pulse will differ from that of the reflected seismic pulse by the above function. Evaluation of the constants in the function indicated may be made by calculations based on information available as to the depth of the substratum and the nature of the subsurface, or alternatively may be obtained by evaluating the information of a trial detonation.

As stated, the present invention is particularly useful in a case where the nature of the earth where the explosion is fired is such that an unusual seismic wave form is propagated. The geological formation at the shot point may so influence the nature of the seismic disturbances produced that, without the information provided by the direct seismic pulse geophone, identification of reflections on the record may be extremely difficult. The confusion caused by random disturbances in the record, other than reflections, is also minimized as the majority of these disturbances may be readily eliminated from consideration by comparison with the trace of the direct seismic pulse.

The nature and objects of the present invention having now been fully described and illustrated, what is claimed as new and useful and is desired to be secured by Letters Patent is:

1. An improved method of prospecting by reflection seismography comprising the steps of initiating seismic waves at a selected source point in the earth, whereby seismic waves will be directed downwardly toward a reflecting substratum, receiving reflected seismic waves at each of a plurality of reception points horizontally displaced from said source point adjacent the surface of the earth, separately receiving downwardly traveling waves at an additional reception point positioned below the source point and in the direct path of seismic waves traveling from said source point to said reflecting substratum, converting the received waves at each of said reception points into electrical oscillations, separately amplifying the electrical oscillations from each reception point, the amplification for the oscillations from said additional reception point differing from the amplification for the oscillations from all of the other reception points by a factor proportional to the normal attenuation of seismic energy in traveling through the earth, and recording the amplified oscillations from each of the reception points simultaneously as separate traces on a single record, said factor being of the form $$e^{-\left(\frac{f}{f_0}\right)^2}$$

wherein $e$ is the base of natural logarithms, $f$ is the frequency of any given wave, and $f_0$ is a reference frequency depending on the depth of reflecting substrata and the nature of the subsurface.

2. Apparatus for reflection seismography comprising a source of seismic energy positioned at a selected source point adjacent the earth's surface, a plurality of seismic detectors positioned adjacent the earth's surface and displaced horizontally from said source point, an auxiliary seismic detector positioned below said source point in the path of seismic energy traveling downwardly into the earth, and separate amplifying and recording means associated with each of said seismic detectors, the amplifying means associated with said auxiliary detector differing in amplifying characteristics from all of the remaining amplifiers by a factor proportioned to the normal attenuation of seismic energy in traveling through the earth, said factor being of the form $$e^{-\left(\frac{f}{f_0}\right)^2}$$

wherein $e$ is the base of natural logarithms, $f$ is the frequency of any given wave, and $f_0$ is a reference frequency depending on the depth of reflecting substrata and the nature of the subsurface.

PHILIP S. WILLIAMS.

REFERENCES CITED

The following references are of record in the file of this patent:

UNITED STATES PATENTS

| Number | Name | Date |
| --- | --- | --- |
| 1,843,725 | Karcher | Feb. 2, 1932 |
| 2,203,272 | Sparks | June 4, 1940 |
| 2,207,398 | Floyd | July 9, 1940 |
| 2,317,334 | Shimek | Apr. 20, 1943 |
| 2,330,216 | Hoover | Sept. 28, 1943 |
| 2,351,456 | Ricker | June 13, 1944 |